Dec. 5, 1967  F. W. PARRISH  3,356,928

REGULATED RECTIFIER FOR WELDING POWER SUPPLIES

Filed Feb. 15, 1965

INVENTOR.
FRANK W. PARRISH
BY
OSTROLENK, FABER, GERB & SOFFEN
ATTORNEYS

United States Patent Office 3,356,928
Patented Dec. 5, 1967

3,356,928
REGULATED RECTIFIER FOR WELDING
POWER SUPPLIES
Frank W. Parrish, El Segundo, Calif., assignor to International Rectifier Corporation, El Segundo, Calif., a corporation of California
Filed Feb. 15, 1965, Ser. No. 432,483
4 Claims. (Cl. 321—18)

ABSTRACT OF THE DISCLOSURE

A welder power supply having three parallel connected rectifier subassemblies. The first is a high voltage low current unit; the second a medium voltage medium current unit which is controllable in output voltage; and the third is a low voltage high current unit. The low voltage high current subassembly is rated to supply the minimum welding current requirements. The medium rated subassembly can be switched into and out of engagement with the load to superimpose increased current on the load when necessary. The high voltage low current section is used to initially strike the arc.

Figure 1:
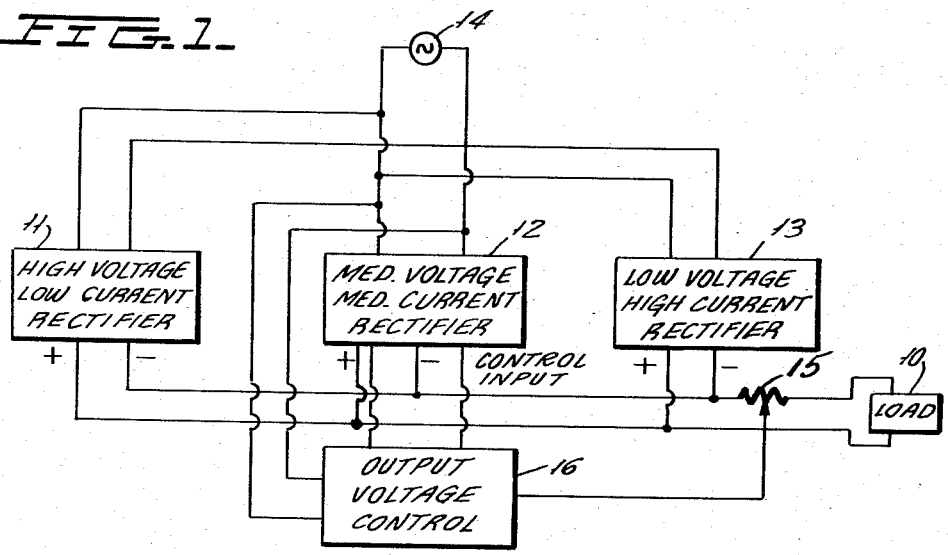

My invention relates to a novel rectifier construction, and more specifically relates to a novel rectifier connection and regulating means therefor for correcting line voltage variation and load variation when used as the rectifier of an inert gas welding power supply system.

Inert gas welders are well known to the art, and are commonly known by the terms "heliarc" for those devices using helium, or as "argonarc" welders which use argon gas. Such devices typically require a high D-C striking voltage followed by the application of low voltage at high current for the actual welding operation. In addition, the welding current supplied to the welding head during the welding cycle must be held constant for good welding operation. The welding current, however, is subject to variation due to variations in both load (arc) resistance and input line voltage.

The present invention provides a novel rectifier having a control arrangement which forces constant current during the welding operation with relatively inexpensive control elements. More particularly, and in accordance with the invention, a plurality of parallel connected rectifier subsystems are driven from a common A-C source and are each connected across the load. A first of these parallel connected rectifier subsystems is a high voltage-low current unit which supplies striking voltage for the welder.

A second of these rectifier subsystems is a low voltage-high current unit which supplies the minimum load voltage and current, which is a relatively large percentage of the maximum required current, required by the load.

The third of the parallel connected rectifier subsystems includes controllable elements such as controlled rectifiers and has a voltage rating which is as high as that which could be required by the welder during operation, and which is controllable between the upper and lower voltage ranges required by the welder, whereupon the controllable rectifier portion of the system can controllably switch from the low voltage-high current unit sufficient additional voltage and current as required within the control range. That is, when this controlled rectifier is turned on, it reverse biases the other rectifier devices so there is a switching action from a first voltage level to a second and higher voltage level when the controlled rectifiers become conductive.

This novel arrangement, therefore, permits the use of controlled rectifiers which do not have to carry the full load current of the welding load with the bulk of this full load current being carried by normal and relatively inexpensive diodes. A novel control circuit is then provided for the control of this medium voltage controlling rectifier system which includes inputs from the A-C line and from the load current which control the firing of the controlled rectifiers in the controlling rectifier system.

Accordingly, a primary object of this invention is to provide a novel power supply for welders.

Yet another object of this invention is to provide a regulated rectifier system wherein the control elements of the rectifier system do not carry full load current of the load.

Yet another object of this invention is to provide a rectifier system which includes a plurality of superimposed rectifier subsystems, one of which carries the bulk of the load current at the lowest regulated voltage; and another of which carries the highest required striking voltage at relatively low current; and a third of which provides the highest operating voltage at a medium current, and is controllable to switch to a controlled output on the first of the rectifier subsystems.

These and other objects of this invention will become apparent from the following description when taken in connection with the drawings, in which:

FIGURE 1 schematically illustrates the invention in block diagram form.

Figure 2:
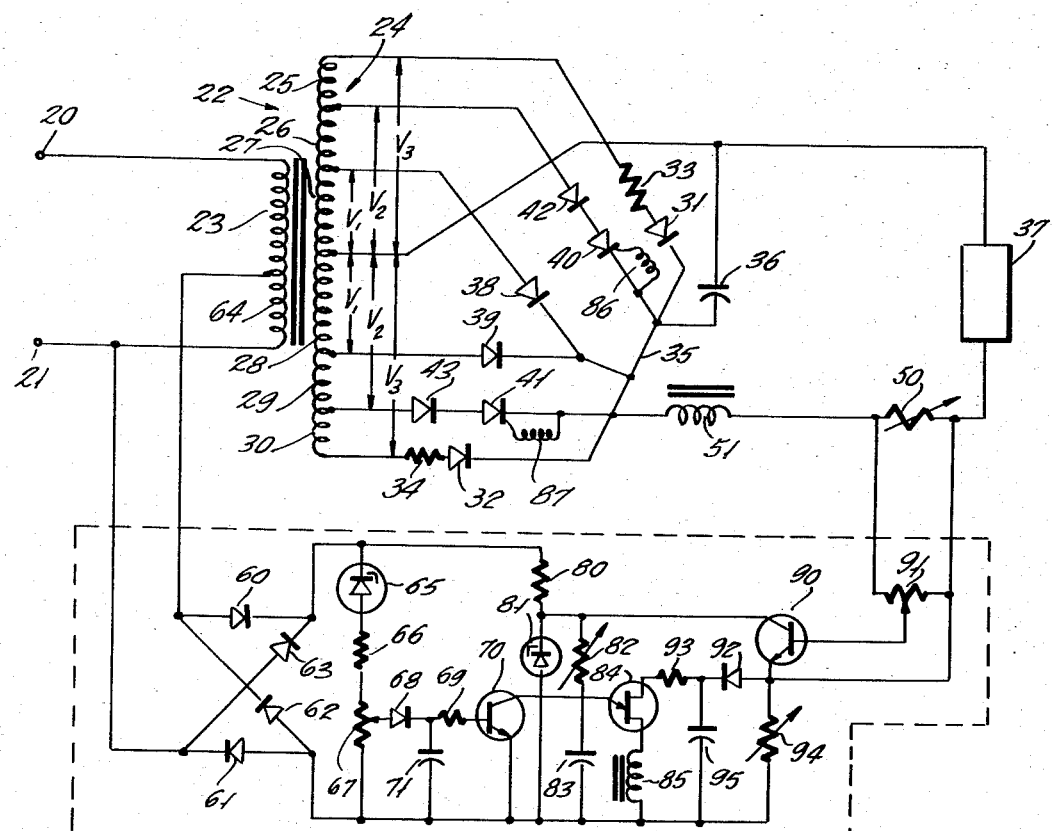

FIGURE 2 is a circuit diagram of the block diagram of FIGURE 1.

Referring first to FIGURE 1, I have illustrated therein a novel rectifier power supply for a welder and particularly for an inert gas welder, shown as load 10. The rectifier system includes three rectifier subassemblies 11, 12 and 13 which are each driven from a common A-C source 14, and are connected in parallel with one another and to the load 10. Where the load 10 is a welder which requires a high striking voltage, the sub-rectifier system 11 is a high voltage-low current rectifier 11 which, for example, could supply a voltage of the order of 60 volts at approximately 1 ampere.

The second rectifier subsystem is the rectifier 13 which is a low voltage-high current rectifier which is capable of supplying the full load current of load 10 at its lowest regulated voltage. For example, rectifier subsystem 13 can provide a fixed voltage of 12 volts at any selected current from 1 to 50 amperes.

The third rectifier subsystem is the rectifier 12 which has a controllable output voltage between the ranges of the voltage of the low voltage rectifier 13 and the highest voltage to which load 10 should be exposed during the actual welding operation. That is to say, the medium voltage-medium current rectifier 12 will have a lower maximum output voltage than will the high voltage system 11. However, the medium voltage rectifier 12 is adjustable between the low voltage of rectifier 13 and some higher voltage limit which is to be connected to load 10 to obtain some maximum welding current.

By way of example, the output voltage of rectifier 12 is adjustable between 0 volts and 22 volts with a maximum output current of 50 amperes. Note that the output of rectifier 12 is switched "ON" at an appropriate time during the cycle and overrides the output of rectifier 13, thereby to add a sufficient increment of current to load 10 as is required.

A voltage input is connected to the output control system 16 from the input A-C voltage source 14 and a current measuring means such as shunt 15 then measures the actual output current through load 10 and provides this information as a current feed back input signal to the output control system 16. Thus the output control 16 is connected to the rectifier 12 and adjusts the output voltage of rectifier 12 in such a manner that some predetermined current will flow through shunt 15 and load 10.

FIGURE 2 illustrates a detailed circuit diagram of the system of FIGURE 1 wherein the input voltage source 14 of FIGURE 1 is comprised of a typical single phase 60-cycle industrial line connected to terminals 20 and 21 which has, for example, a voltage of 230 volts. This voltage is variable within industrial tolerances.

The terminals 20 and 21 are then connected to a main rectifier transformer 22 which has a primary winding 23 and a center tapped secondary winding 24. More particularly, winding 24 is comprised of winding sections 25, 26, 27, 28, 29 and 30. The total of sections 25 through 30 then define a first single phase full wave supply to rectifier 11 which includes the rectifier diodes 31 and 32 which are connected in series with resistors 33 and 34, respectively.

The diodes 31 and 32 are then connected to a common bus 35 which is connected to the positive terminal of capacitor 36. The negative terminal of capacitor 36 is then connected to the center tap of transformer winding 24. This circuit then defines a high voltage-low current rectifier system equivalent to rectifier 11 of FIGURE 1. That is to say, a voltage $V_3$ appears from the center tap to each phase of this sub-rectifier assembly, which is the highest possible voltage obtainable from the transformer. In a typical application, this voltage will be sufficient to charge capacitor 36 to the order of 60 volts which is sufficient to strike an arc in a welding head load 37 which is connected across the transformer center tap and bus 35.

The winding sections 27 and 28 then define a second full wave single phase rectifier subsystem which includes the rectifier diodes 38 and 39 which are connected to the bus 35 and are high current-low voltage diodes which will carry the bulk of the welding current through the welding load 37. Thus, a voltage $V_1$ appears between the center tap of this rectifier and its outer legs; this rectifier corresponding to rectifier 13 of FIGURE 1.

Finally, the controllable rectifier subsystem in FIGURE 2 is the subsystem which uses the winding sections 26 through 29, and includes controlled rectifiers 40 and 41 which are connected in series with normal rectifier diodes 42 and 43, respectively, which provide the required reverse voltage rating for the controlled rectifiers 40 and 41 which may have a reverse voltage rating lower than that available from the transformer windings. Clearly, rectifier diodes 42 and 43 can be eliminated by using higher voltage rates controlled rectifiers 40 and 41. Thus, this third subsystem is a medium voltage rectifier subsystem whose output can be controlled and corresponds to rectifier 12 of FIGURE 1.

The operation of the system described to this point is such that the rectifier subsystem including rectifiers 31 and 32 will strike the arc at welding load 37, while rectifiers 38 and 39 will provide the bulk of the actual welding current required after the arc is struck. The rectifier subsystem including controlled rectifiers 40 and 41 will then adjustably switch in a sufficient additional voltage across the welding head to provide the required constant load current which is at some predetermined value as determined by a suitable load current measuring system.

More particularly, FIGURE 2 illustrates the shunt 50 which can be an adjustable resistance connected in series with a smoothing choke 51. The shunt 50 provides means for measuring the current flowing through the welding head 37 and, by suitable adjustment of its resistance, will define the desired load current to be maintained.

In order to control the current through welding head 37, an output voltage control system is provided, as shown within the dotted lines of FIGURE 2, and which could be carried on a carrier support module where this dotted line block is labeled with numeral 16 equivalent to the output voltage control system 16 of FIGURE 1.

The control system of FIGURE 1 includes a bridge connected rectifier which includes diodes 60, 61, 62 and 63 which are connected across winding section 64 of primary winding 23 of transformer 22. Thus, the output D-C voltage of the bridge connected rectifier system including the diodes 60 to 63 will be related to the input line voltage. The output of this rectifier is then connected across the series connection of the break-down diode 65, resistor 66 and adjustable resistor 67. The wiper arm on adjustable resistor 67 is then connected to a diode 68, and resistor 69 to the base of transistor 70. A capacitor 71 is then connected between diodes 68 and resistor 69.

This portion of the control circuit defines an integrating circuit connected to the base of transistor 70 whose input is proportional to the magnitude of the line voltage. As will be seen hereinafter, the output of transistor 70 determines the firing point of controlled rectifiers 40 and 41 to maintain a constant output current even though the line voltage varies within industrial tolerances.

The output voltage of diodes 60 through 63 is next applied to the circuit including resistor 80 and break-down diode 81. The juncture of resistor 80 and break-down diode 81 is then connected to the resistor 82 and capacitor 83 which are in turn connected to the emitted of uniujnction transistor 84 and defines the timing circuit of the unijunction transistor 84 which directly controls the firing of the controlled rectifier.

More specifically, the unijunction transistor 84 is connected in series with primary winding 85 of a pulse transformer having secondary windings 86 and 87. These secondary windings are shown in the upper portion of the figure and are connected to the gate circuit of controlled rectifiers 40 and 41. Thus, when the unijunction transistor 84 is triggered, a voltage pulse is applied to primary winding 85 and thus to secondary windings 86 and 87 which fire the controlled rectifiers 40 and 41 at some suitably timed interval within the A-C cycle.

The inter-base voltage of unijunction transistor Q2 is then regulated by the transistor 90. The collector circuit of transistor 90 is then driven from the output voltage of diodes 60 through 63 which is connected to the junction between resistor 80 and break-down diode 81. The base emitter circuit of transistor 90 is then connected into the output voltage of shunt 50 by means of the potentiometer 91 connected across shunt 50, as shown. Clearly, other multi-transistor arrangements could be used in place of transistor 90 for higher gain.

The emitter circuit of transistor 90 is more particularly connected through diode 92 and resistor 93 where the diode 92 is connected in closed series with the adjustable load resistor 94 and filter capacitor 95.

In operation, it will be seen that the variable line voltage obtained from diodes 60 through 63 and the measured load current flowing through shunt 50 are combined in effect in their connection to the unijunction transistor 84 in that the input line voltage adjusts the emitter voltage, while the line current fluctuations adjust the inter-base voltage of the transistor 84.

Thus, the unijunction transistor 84 will fire, thereby to apply a firing pulse to controlled rectifiers 40 and 41 only at those times calculated to increase or decrease the output voltage of the rectifier system including controlled rectifiers 40 and 41 to cause the required increase or decrease of current through shunt 50 as compared to some predetermined value required.

Note that the cooperation of these two input variables permit the use of a relatively simplified adjustment circuit or control circuit for controlling the firing point of the controlled rectifiers 40 and 41.

In a typical application of the invention, the following components were used:

Item
61, 62, 63, 64—10DB6A single phase bridge assembly
65—IN3044A breakdown (zener) diode
66—7KΩ resistor.
67—2KΩ, 2-watt potentiometer 68—10DZ silicon diode
69—22KΩ resistor
70—2N697 transistor, silicon NPN
71—15μf, 25-volt capacitor
80—2.2KΩ 5-watt resistor
81—10Z27T5 breakdown (zener) diode
82—5.6KΩ timing resistor
83—1 μf, 200 v. timing capacitor
84—2N2160 unijunction transistor
85, 86, 87—Pulse transformer sprague 31Z286
90—2N697 transistor, silicon NPN
91—100Ω, potentiometer
93—390Ω resistor
94—1KΩ resistor
95—5 μf, 50-volt capacitor In addition, while the invention as described pertains only to a single phase, center tap rectification circuit, the same methods are also applicable to single phase bridge circuits, and, by suitable modifications known to those skilled in the art, to polyphase rectifier circuits also.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A rectifier system for supply power to a D-C load from an A-C source; said rectifier system comprising a first and second rectifier subsystem; said first rectifier subsystem including rectifier diode means having a given current rating substantially equal to the lowest load current to be carried by said load and having a given output voltage; said second rectifier subsystem including controlled rectifier means having an output voltage adjustable from said given output voltage of said rectifier diode means to a voltage output substantially higher than said given output voltage; said first and second rectifier subsystems each having input A-C terminals and output D-C terminals; said input A-C terminals each connected to said A-C source; said output D-C terminals being connected in parallel with one another and across said load; and control means connected to said controlled rectifier means for adjustably switching additional output voltage from said second rectifier subsystem in place of said first rectifier subsystem to adjustably control the current through said load; and a third rectifier subsystem; said third rectifier subsystem having a current rating lower than said given current rating of said first rectifier subsystem and an output voltage higher than said output voltage of said second rectifier subsystem; said third rectifier subsystem having input A-C terminals and output D-C terminals; said input A-C terminals connected to said A-C source; said output D-C terminals connected in parallel with said output D-C terminals of said first and second rectifier subsystems.

2. The device substantially as set forth in claim 1 wherein said load comprises a welder.

3. The rectifier subsystem substantially as set forth in claim 2 wherein said A-C source includes first, second and third transformer means connected to said first, second and third rectifier subsystems; said first, second and third transformer means having different output voltages; said first, second and third transformer means connected to said first, second and third rectifier subsystem input A-C terminals, respectively.

4. The device substantially as set forth in claim 3 wherein said control means includes firing means responsive to variations in said load current and the voltage of said A-C source from predetermined values; said control means having first and second input circuit means connected to said A-C source and said D-C load, respectively.

References Cited

UNITED STATES PATENTS

| | | | |
|---|---|---|---|
| 2,734,981 | 2/1956 | Bichsel et al. | 219—131 |
| 3,284,666 | 11/1966 | Hajicek | 219—131 X |

JOHN F. COUCH, *Primary Examiner.*

G. GOLDBERG, *Assistant Examiner.*